(12) United States Patent
Kim et al.

(10) Patent No.: US 11,052,831 B1
(45) Date of Patent: Jul. 6, 2021

(54) DISPLAY MOVING APPARATUS

(71) Applicants: HYUNDAI MOTOR COMPANY, Seoul (KR); KIA MOTORS CORPORATION, Seoul (KR)

(72) Inventors: Minhan Kim, Gunpo-si (KR); Jung Yup Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/855,143

(22) Filed: Apr. 22, 2020

(30) Foreign Application Priority Data

Dec. 11, 2019 (KR) .......................... 10-2019-0165050

(51) Int. Cl.
*B60R 11/00* (2006.01)
*B60R 11/02* (2006.01)
*B60K 35/00* (2006.01)

(52) U.S. Cl.
CPC .......... *B60R 11/0235* (2013.01); *B60K 35/00* (2013.01); *B60K 2370/67* (2019.05); *B60R 2011/0028* (2013.01); *B60R 2011/0084* (2013.01); *B60R 2011/0089* (2013.01); *B60R 2011/0092* (2013.01)

(58) Field of Classification Search
CPC ..... B60R 2011/0003; B60R 2011/0028; B60R 2011/0042; B60R 2011/008; B60R 2011/0084
USPC ............... 248/317, 323, 324, 326, 327, 920; 296/37.7, 37.8
See application file for complete search history.

(56) References Cited

U.S. PATENT DOCUMENTS

| | | | | |
|---|---|---|---|---|
| 4,750,832 A | * | 6/1988 | Lloyd, Sr. .............. | F16M 11/18 352/104 |
| 6,412,848 B1 | * | 7/2002 | Ceccanese ............ | B60K 35/00 296/37.7 |
| 6,476,879 B1 | * | 11/2002 | Ho ..................... | B64D 11/0015 312/319.6 |
| 7,607,710 B2 | * | 10/2009 | Yeo .................... | B60R 11/0235 248/917 |
| 8,186,637 B2 | * | 5/2012 | Walters ................. | F16M 11/12 248/279.1 |
| 2002/0021279 A1 | * | 2/2002 | Nakasuna ............... | H04N 5/64 345/156 |
| 2008/0100548 A1 | * | 5/2008 | Choi ................... | B60R 11/0235 345/87 |
| 2009/0008526 A1 | * | 1/2009 | Yeo .................... | B60R 11/0235 248/323 |

* cited by examiner

*Primary Examiner* — Steven M Marsh
(74) *Attorney, Agent, or Firm* — Brinks Gilson & Lione

(57) ABSTRACT

An exemplary display moving apparatus capable of moving a display in a vehicle includes: a center rail unit to slide along a length direction of the vehicle; a swing unit that is disposed below the center rail unit and rotates relative to a height direction of the vehicle; an expansion unit that is connected to the swing unit and may slide along a width direction of the vehicle; a folding unit that includes a fixed bracket mounted to a bottom of the expansion unit, and a folding bracket rotatably connected to the fixed bracket through a hinge pin; and a height adjusting unit that is connected to the folding unit and slides the display along the height direction of the vehicle.

18 Claims, 20 Drawing Sheets

Figure 1:
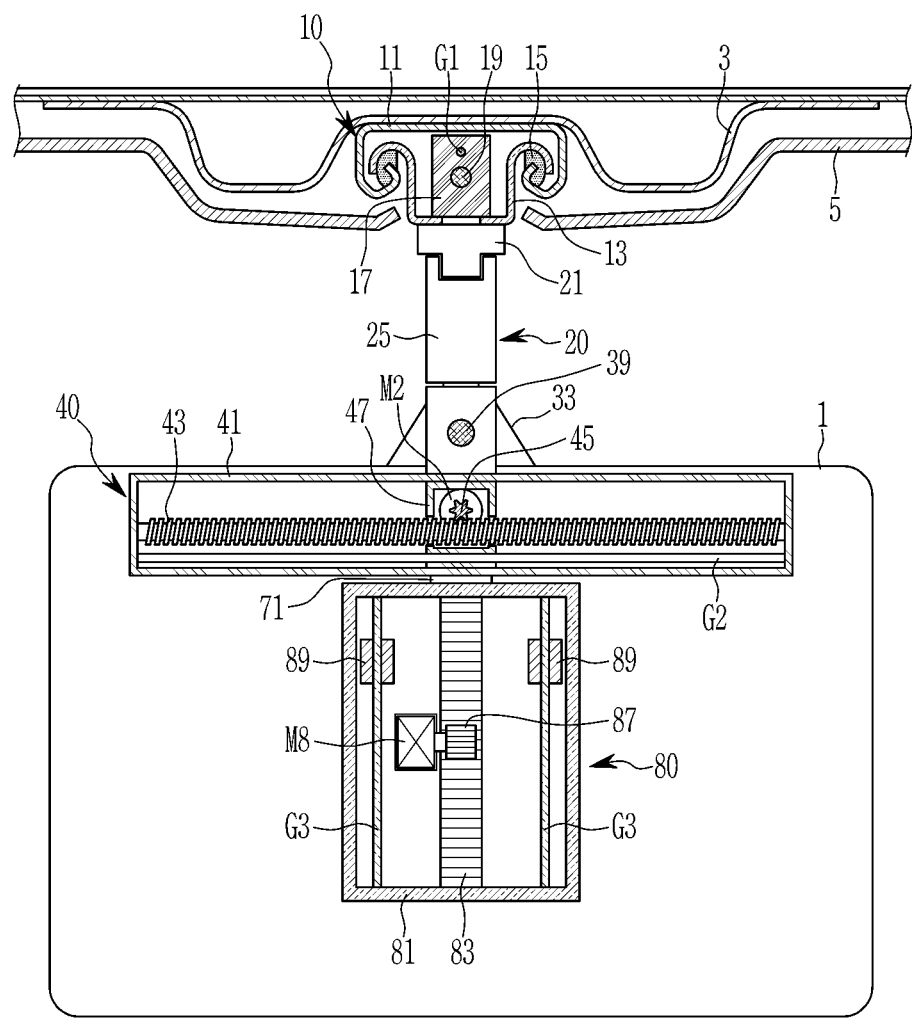

FIG. 3A
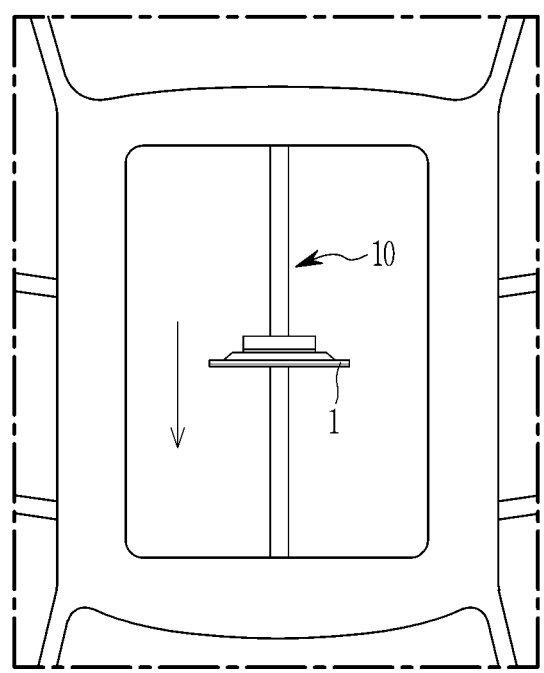
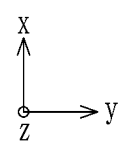

FIG. 3E
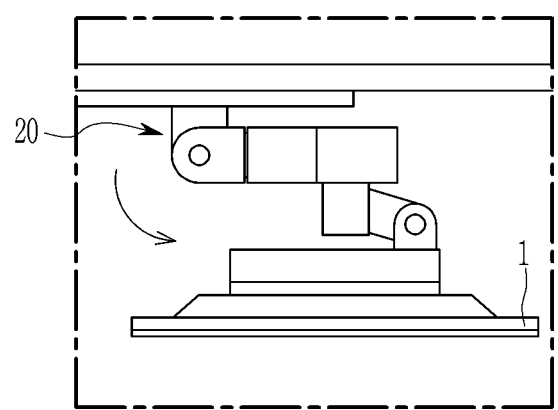
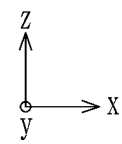

FIG. 6E
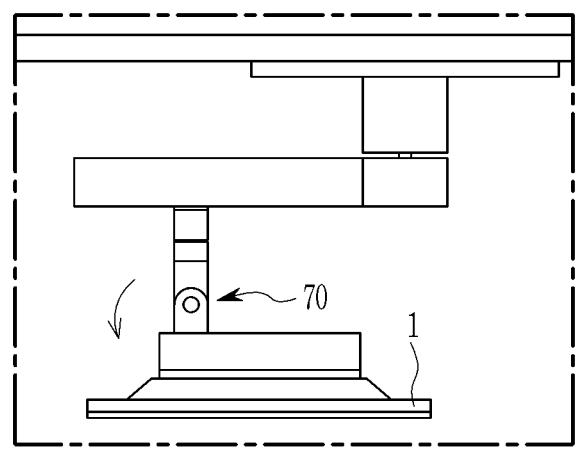
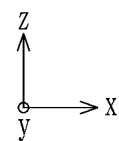

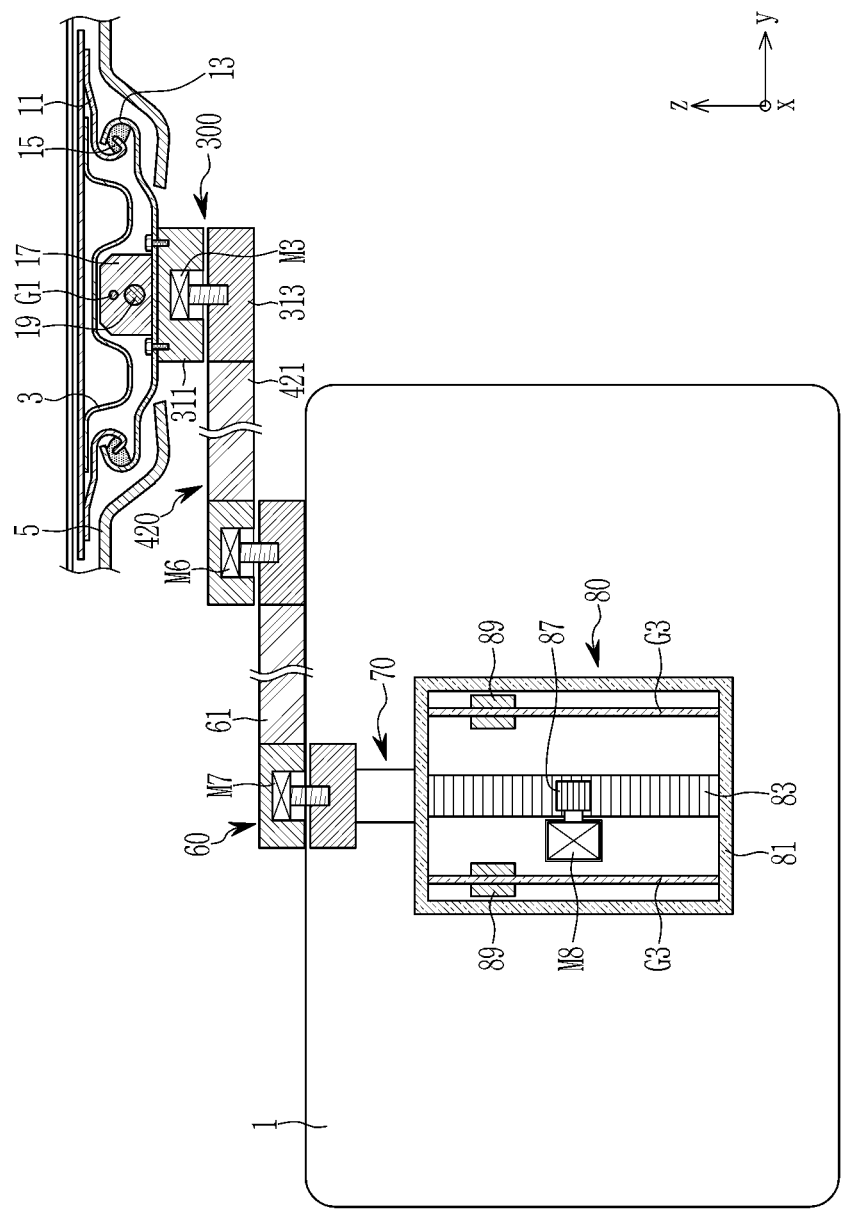

DISPLAY MOVING APPARATUS

CROSS-REFERENCE TO RELATED APPLICATION

This application claims priority to and the benefit of Korean Patent Application No. 10-2019-0165050, filed on Dec. 11, 2019, the entire contents of which are incorporated herein by reference.

FIELD

The present disclosure relates to a display moving apparatus.

BACKGROUND

The statements in this section merely provide background information related to the present disclosure and may not constitute prior art.

A rear seat monitor of a vehicle is typically mounted to a seat back or a headrest of a front seat or to a center console.

In the case that a monitor is mounted to the seat back of the front seat, when a user adjusts reclining of the front seat, the monitor becomes farther or tilted and thus it deteriorates visibility of the monitor screen.

We have discovered that in the case of that the monitor mounted to the center console, an available size is limited, and usability of the arm rest is deteriorated.

Furthermore, in the case of a multi-purpose vehicle (MPV), the monitor is frequently mounted to the roof at a fixed position and angle, and therefore, an occupant may become in an uncomfortable posture to see the screen of the monitor.

Therefore, it may be advantageous when a monitor is comfortably watched regardless of the occupant's position including front and rear seats.

The above information disclosed in this Background section is only for enhancement of understanding of the background of the present disclosure and therefore it may contain information that does not form the prior art that is already known to a person of ordinary skill in the art.

SUMMARY

The present disclosure provides a display moving apparatus having advantages of moving a display regardless of seating positions in a vehicle and thereby improving usability of the display.

An exemplary display moving apparatus capable of moving a display in a vehicle includes: a center rail unit configured to slide along a length direction of a vehicle; a swing unit disposed below the center rail unit, and configured to rotate relative to a height direction of the vehicle; an expansion unit connected to the swing unit and configured to slide along a v width direction of the vehicle; a folding unit including: a fixed bracket mounted to a bottom of the expansion unit, and a folding bracket rotatably connected to the fixed bracket through a hinge pin; and a height adjusting unit connected to the folding unit and configured to slide a display along the height direction.

The center rail unit may include: an upper rail mounted along a center roof frame disposed in the length direction; a lower rail slidably mounted along the upper rail interposing a slider; a first screw disposed in the length direction between the upper rail and the lower rail; a first actuator connected to an end of the first screw and configured to rotate the first screw; a first screw housing disposed between the upper rail and the lower rail, bolt-engaged with the lower rail in a state fitted with the first screw, and configured to slide along the first screw together with the lower rail by the operation of the first actuator; and a first guide bar disposed in the length direction, having both ends having fixed positions, and configured to guide a movement of the first screw housing.

An exemplary display moving apparatus may further include a hinge unit disposed between the center rail unit and the swing unit and configured to tilt the display by a predetermined angle.

The hinge unit may include: a hinge bracket mounted to a bottom center portion of a lower rail, and a hinged bar hinged to the hinge bracket through a hinge pin.

The swing unit may include a swing bar rotatably coupled with the hinge unit, and a rib formed between the expansion unit and the swing bar.

The expansion unit may include: a worm shaft case mounted to the swing unit and extending in the width direction of the vehicle; a worm shaft disposed along in the width direction and having both ends rotatably installed inside the worm shaft case; a second guide bar disposed at an adjacent position of the worm shaft, being elongated in the width direction, and having both ends fixed; a second actuator installed inside a motor case slidably mounted to the worm shaft case; and a worm wheel coupled with a rotation shaft of the second actuator and teeth-engaged with the worm shaft.

The fixed bracket of the folding unit may be mounted to a bottom of the motor case, and configured to slide in the width direction by the operation of the worm shaft and the worm wheel.

The swing unit may include: a first fixed bar fixed to the lower rail, a third actuator mounted to the first fixed bar, and a first rotating bar disposed below the first fixed bar and connected to the third actuator to be rotated relative to the height direction.

The expansion unit may include: a screw case mounted to the first rotating bar, extending in the length direction, and configured to rotate by a rotation of the first rotating bar, a fourth actuator mounted inside the screw case, a second screw disposed within the screw case, configured to rotate by the fourth actuator, and elongated along the screw case, and a second screw housing engaged with the second screw and configured to slide along the second screw by the fourth actuator.

The exemplary display moving apparatus may further include a sub-swing unit disposed between the expansion unit and the folding unit and configured to rotate relative to the height direction of the vehicle.

The sub-swing unit may include: a second fixed bar mounted to a bottom of the second screw housing, a fifth actuator mounted to the second fixed bar, and a second rotating bar disposed below the second fixed bar and connected to the fifth actuator to be rotated relative to the height direction of the vehicle.

The folding bracket of the folding unit may be mounted to a bottom of the second rotating bar.

The expansion unit may include a first arm mounted to the first rotating bar, extending in the length direction, and configured to rotate together with the first rotating bar.

The exemplary display moving apparatus may further include a link unit rotatably coupled with the first arm.

The link unit may include a sixth actuator mounted on the first arm, a second arm configured to rotate by the sixth actuator, and a seventh actuator mounted to the second arm.

The folding bracket of the folding unit may be connected to a rotation shaft of the seventh actuator.

The height adjusting unit may include: a fixed plate mounted to a front end of the folding bracket, a rack gear disposed at the fixed plate and elongated in the height direction, a connection plate connected to the fixed plate, configured to mount the display, and installed with an eighth actuator, and a pinion gear coupled with a driveshaft of the eighth actuator and gear-engaged with the rack gear.

The height adjusting unit may include: a third guide bar disposed at both sides of the rack gear in the fixed plate, and a slider member mounted to the connection plate and slidably installed to the third guide bar.

According to a display moving apparatus according to an exemplary form, a display may be moved in various directions in a vehicle, such as vehicle length direction, vehicle width direction, and vehicle height direction, and therefore, a display may be moved in a preferred position regardless of seating positions in a vehicle, and thereby improving usability of the display.

Further, effects that can be obtained or expected from exemplary forms are directly or suggestively described in the following detailed description. That is, various effects expected from exemplary forms will be described in the following detailed description.

Further areas of applicability will become apparent from the description provided herein. It should be understood that the description and specific examples are intended for purposes of illustration only and are not intended to limit the scope of the present disclosure.

DRAWINGS

Figure 2:
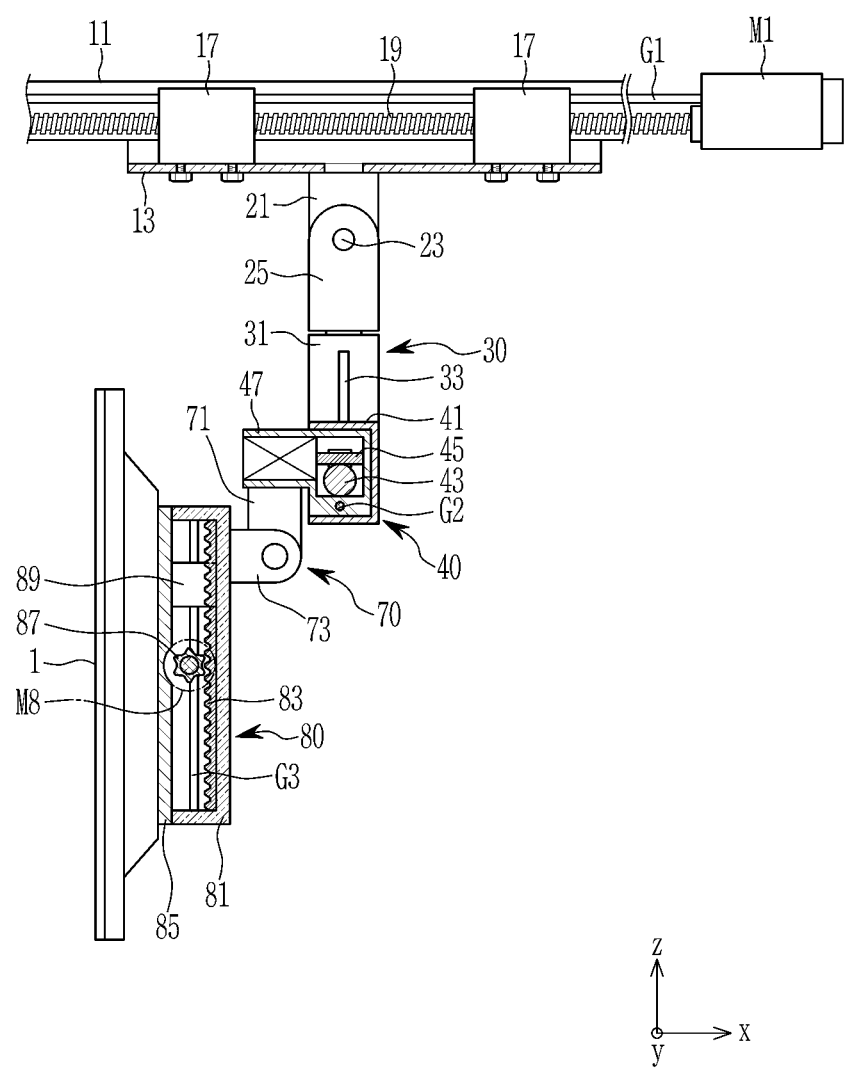
Figure 4:
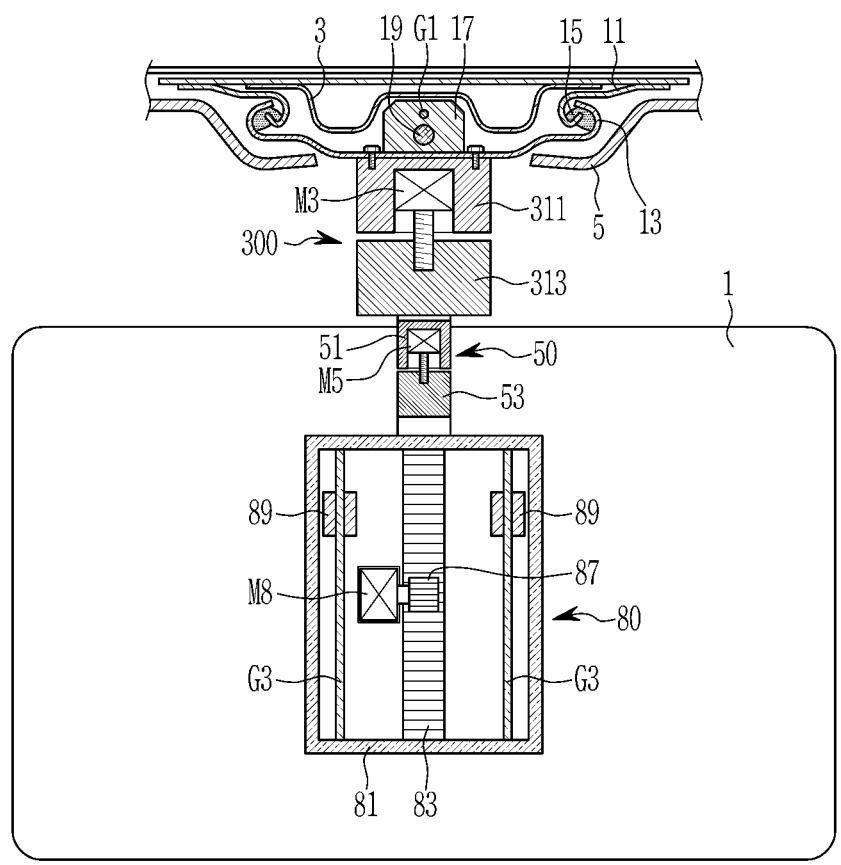
Figure 5:
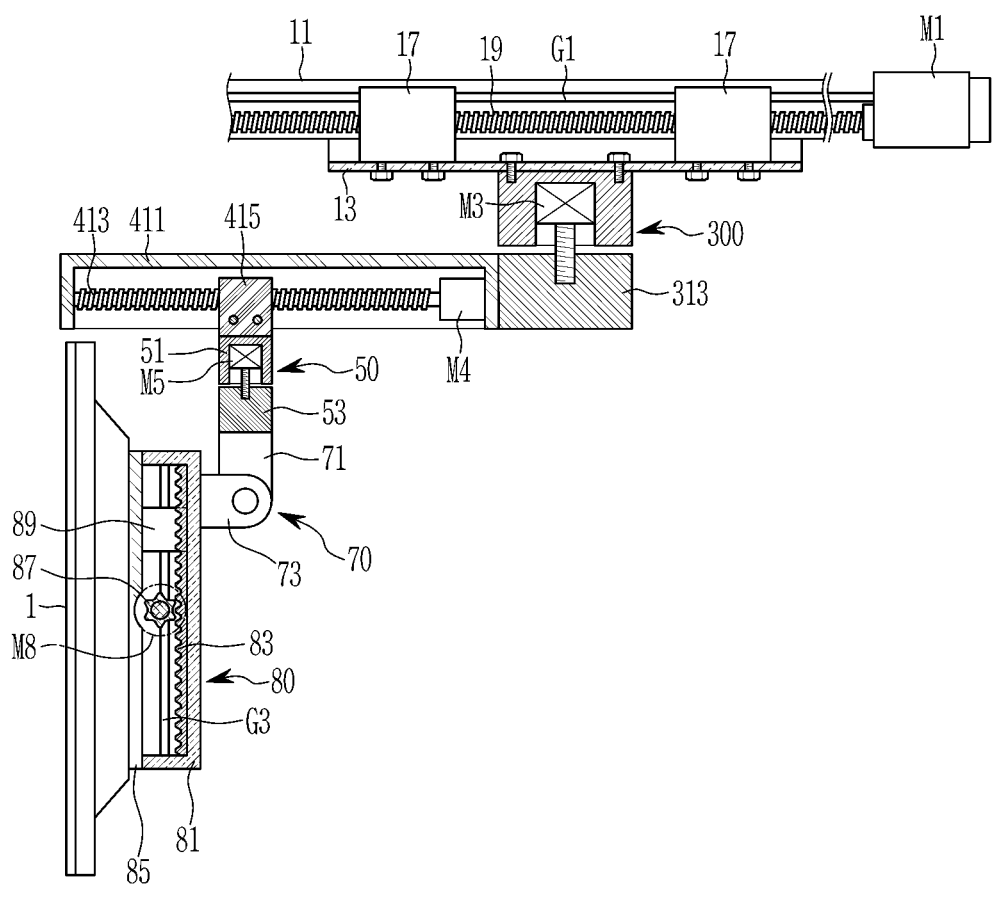
Figure 8:
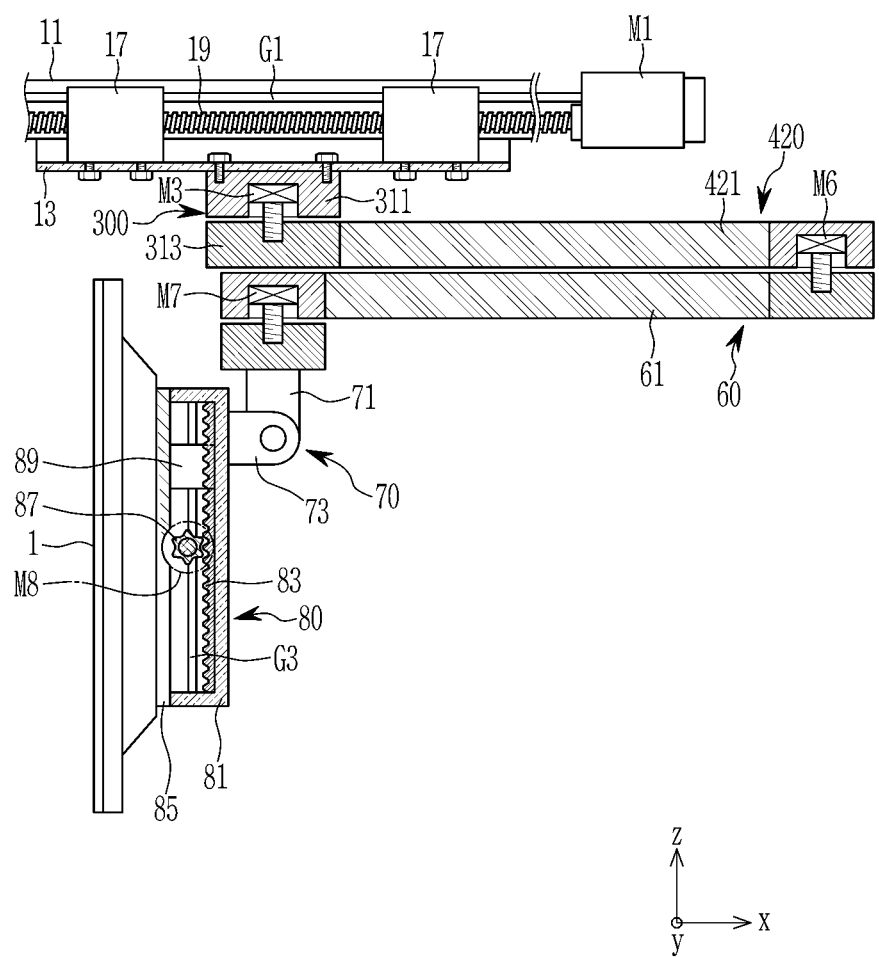

In order that the disclosure may be well understood, there will now be described various forms thereof, given by way of example, reference being made to the accompanying drawings, in which:

FIG. 1 and FIG. 2 are schematic diagrams of a display moving apparatus according to a first exemplary form of the present disclosure;

FIGS. 3A to 3E respectfully illustrate an operation diagram of a display moving apparatus according to a first exemplary form of the present disclosure;

FIG. 4 and FIG. 5 are schematic diagrams of a display moving apparatus according to a second exemplary form of the present disclosure;

FIGS. 6A to 6E respectfully illustrate an operation diagram of a display moving apparatus according to a second exemplary form of the present disclosure;

FIG. 7 and FIG. 8 are schematic diagrams of a display moving apparatus according to a third exemplary form of the present disclosure; and FIGS. 9A to 9D respectfully illustrate an operation diagram of a display moving apparatus according to a third exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

A display moving apparatus according to exemplary forms enables moving a display 1 in a vehicle to a desired position as desired by a driver or passengers, such that the display 1 may be comfortably used regardless of a position of an occupant in the vehicle.

That is, the display moving apparatus enables moving of the display 1 to a desired position, unlike a conventional display device fixed to a seat or a roof rail.

For example, when the display moving apparatus is applied to a vehicle having a plurality of row seats, the display 1 may be moved to and rotated at a required row position for convenience of a user.

A display moving apparatus according to exemplary forms includes a center rail unit 10, a swing unit 30, an expansion unit 40, a folding unit 70, and a height adjusting unit 80.

FIG. 1 and FIG. 2 are schematic diagrams of a display moving apparatus according to a first exemplary form, and FIG. 3 is an operation diagram of a display moving apparatus according to the first exemplary form.

Referring to FIG. 1 and FIG. 2, the display moving apparatus includes: a center rail unit 10, a swing unit 30, an expansion unit 40, a folding unit 70, and a height adjusting unit 80, and may further include hinge unit 20 disposed between the center rail unit 10 and the swing unit 30.

Firstly, the center rail unit 10 may be disposed between a center roof frame 3 and a head lining 5 of a vehicle.

The center rail unit 10 may slide the display 1 along a vehicle body length direction.

In the specification, respective elements may be described with reference to a length direction (vehicle length direction), a width direction (vehicle width direction), and a height direction (vehicle height direction) of a vehicle body. Here, the length direction of a vehicle body may mean a vehicle's running direction, the vehicle width direction may mean a direction perpendicular to the length direction, and the vehicle height direction may mean a direction directed upward from the ground.

In other words, the vehicle height direction may be a direction along z-axis, the length direction may be a direction along x-axis, and the vehicle width direction may be a direction along y-direction that is perpendicular to the x-axis (refer to FIG. 1 and FIG. 2).

The above definition of reference directions has relative meanings, and may not necessarily limited thereto since directionality may vary depending on reference positions of the exemplary apparatus or constituent parts employed therein.

For example, when a vehicle is provided with first to third row seats, the center rail unit 10 may be formed to allow slide movement of the display 1 from a first row seat to a third row seat along the length direction of the vehicle and stoppage at predetermined position.

Although the center rail unit 10 is described to be disposed between the center roof frame 3 and the head lining 5 as an example, the present disclosure is not limited thereto, and may vary depending of specific vehicles. For example, when a vehicle is not provided with a roof frame 3, the center rail unit 10 may be disposed between the head lining 5 and a roof member, such as a roof reinforce panel or a roof panel.

The center rail unit 10 includes an upper rail 11 disposed along vehicle length direction and a lower rail 13 slidably moves on the upper rail 11.

The upper rail 11 may be formed in a straight line, or in a curved line. When the upper rail 11 is formed in a curved line having a predetermined curvature, a display moving apparatus according to an exemplary form may be applied regardless of vehicle types.

In addition, a slider 15 is interposed between the upper rail 11 and the lower rail 13. The slider 15 is employed to provide a lubrication function between the upper rail 11 and the lower rail 13, and therefore, the lower rail 13 may smoothly slide along the upper rail 11.

A plurality of first screw housings 17 are disposes between the upper rail 11 and the lower rail 13, and the first screw housings 17 may be bolt-engaged with the lower rail 13. A first screw hole receiving a first screw 19 is formed through the first screw housings 17, and an interior of the first screw hole is threaded with threads corresponding to the first screw 19. For example, two first screw housings 17 may be disposed above the lower rail 13.

In addition, the first screw 19 is disposed along the vehicle length direction below the upper rail 11.

The first screw 19 fits into the first screw hole of the first screw housings 17. By the rotation of the first screw 19, the first screw housings 17 together with the lower rail 13 slide along the first screw 19.

A first actuator M1 is connected to an end of the first screw 19. The first actuator M1 may be a motor producing power to rotate the first screw 19.

The first actuator M1 may be fixed to the upper rail 11 or to a vehicle body.

In addition, a first guide bar G1 may be disposed adjacent to the first screw 19, e.g., above the first screw 19.

The first guide bar G1 is disposed in the vehicle length direction and has both ends fixed to the upper rail 11 or to the vehicle body, and the first guide bar G1 is inserted into the first screw housings 17 through a first guide hole. When the first screw housings 17 move along the first screw 19, the first guide bar G1 guides a movement of the first screw housings 17, and thus, supports the first screw housings 17 and the lower rail 13.

A hinge unit 20 for tilting the display 1 by a predetermined angle is disposed under the center rail unit 10.

The hinge unit 20 may include a hinge bracket 21 mounted at a bottom center portion of the lower rail 13, and a hinged bar 25 hinged to hinge bracket 21 through a hinge pin 23.

The hinged bar 25 is connected to the hinge bracket 21 such that the hinged bar 25 may tilt (or rotate) by a predetermined angle around the hinge pin 23.

Under the hinge unit 20, a swing unit 30 is provided to rotate the display 1 with respect to the vehicle height direction.

The swing unit 30 may include a swing bar 31 that is rotatably coupled with the hinged bar 25 of the hinge unit 20. An end of the hinged bar 25 is hinged to a vertical rotation shaft 39 of the swing bar 31 such that the swing bar 31 may rotate with respect to the hinged bar 25 by a predetermined angle.

The swing bar 31 may be provided with a rib 33 for reinforcing strength between the swing bar 31 and an expansion unit 40 described below.

Under the swing unit 30, the expansion unit 40 is disposed slidably in the vehicle width direction.

The expansion unit 40 may move the display 1 in the vehicle width direction.

The expansion unit 40 may include a worm shaft case 41 that extends in the vehicle width direction and has a central portion mounted to the swing unit 30 to be basically symmetrically disposed.

The worm shaft case 41 may be formed with an open side.

For example, with reference to FIG. 1, the worm shaft case 41 may be formed such that a front is open.

A worm shaft 43 is provided inside the worm shaft case 41. The worm shaft 43 can be disposed along in the vehicle width direction with both ends rotatably installed inside the worm shaft case 41.

In addition, a second guide bar G2 is provided inside the worm shaft case 41.

The second guide bar G2 is disposed at an adjacent position of the worm shaft 43 (e.g., a lower side of the worm shaft 43), and elongated in the vehicle width direction.

A motor case 47 may be installed inside the worm shaft case 41 and a second actuator M2 may be installed inside the motor case 47. The second actuator M2 may be a motor producing power to rotate the worm shaft 43.

A driveshaft of the second actuator M2 may be coupled with a worm wheel 45 that is gear-engaged with the worm shaft 43. Therefore, when the worm wheel 45 is rotated by the second actuator M2, the motor case 47 is moved in the vehicle width direction while the worm wheel 45 geared with the worm shaft 43 rotates.

The second guide bar G2 is disposed in the worm shaft case 41 and both ends of the second guide bar G2 are fixed, and the motor case 47 is slidably mounted to the worm shaft case 41. Therefore, the worm shaft case 41 is stably supported when the worm shaft case 41 moves along the vehicle width direction by the rotation of the worm shaft 43.

In one form, a folding unit 70 is provided under the expansion unit 40.

The folding unit 70 includes a fixed bracket 71 and a folding bracket 73. According to a first exemplary form, the fixed bracket 71 may be mounted to a bottom of the motor case 47.

The fixed bracket 71 of the folding unit 70 may be mounted to the motor case 47. The folding bracket 73 may be hinged to the fixed bracket 71 to tilt (or rotate) by a predetermined angle in the vehicle length direction.

The tilting angle of the folding unit 70 may be adjusted in a range of 90° to 180° between the fixed bracket 71 and the folding bracket 73.

In another form, a height adjusting unit 80 is provided under the folding unit 70.

The height adjusting unit 80 may include a fixed plate 81 mounted to a front end of the folding bracket 73, and a rack gear 83 disposed at a center of the fixed plate 81 and elongated in the vehicle height direction.

In addition, a connection plate 85 is installed to the fixed plate 81 slidably in vehicle height direction, and the connection plate 85 may slide in the vehicle height direction through a pinion gear 87 corresponding to the rack gear 83.

That is, an eighth actuator M8 is installed to the connection plate 85, and the eighth actuator M8 may be a motor. A driveshaft of the eighth actuator M8 is coupled with a pinion gear 87 that is gear-engaged with a rack gear 83. Therefore, when the pinion gear 87 rotates by the operation of the eighth actuator M8, the connection plate 85 and the eighth actuator M8 move in the vehicle height direction along the rack gear 83.

In addition, a third guide bar G3 is disposed in the vehicle height direction in the fixed plate 81, and the connection plate 85 is installed with slider member 89 into which the third guide bar G3 is slidably inserted. The third guide bar G3 may be disposed at both sides of the eighth actuator M8.

When the connection plate 85 moves in the vehicle height direction by the operation of the eighth actuator M8, the connection plate 85 may stably move in the vehicle height direction, since the slider member 89 mounted to the connection plate 85 may be stably supported by the third guide bar G3.

The display 1 is mounted to a front of the connection plate 85.

Referring to FIGS. 3A-3E, an operation of a display moving apparatus according to a first exemplary form is described in detail.

Figure 3B:
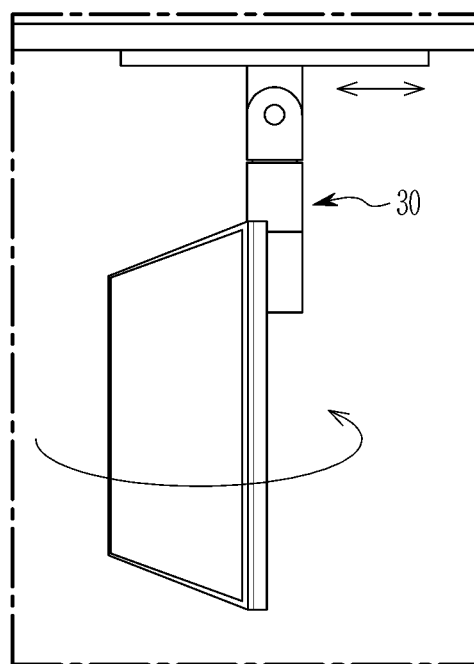
Figure 3C:
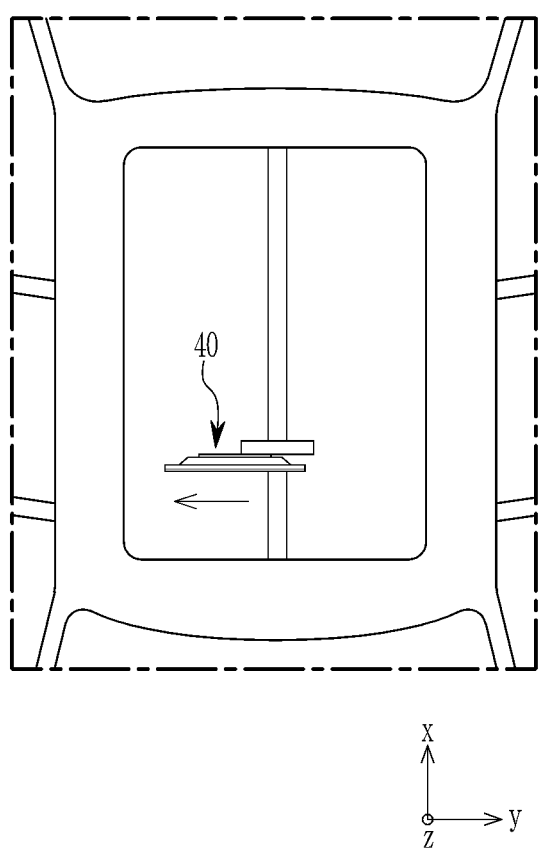

Firstly, when the center rail unit 10 is operated, the display 1 moves in the x-axis direction of the vehicle body (vehicle length direction) (refer to FIG. 3A). When the swing unit 30 is operated, the display 1 may rotate about the z-axis (vehicle height direction) (refer to FIG. 3B). When the expansion unit 40 is operated, the display 1 moves in the y-axis direction (vehicle width direction) (refer to FIG. 3C).

Figure 3D:
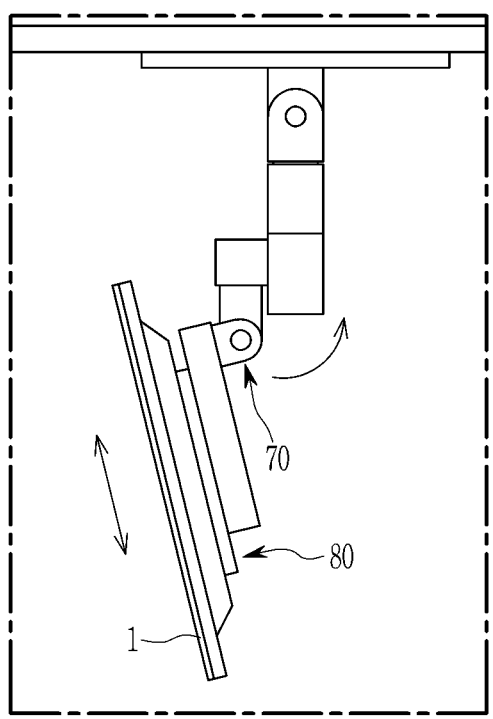

In addition, the display 1 may be tilted by the folding unit 70 with respect to the y-axis by a predetermined angle, and when the height adjusting unit 80 is operated, the display 1 may move in the z-axis direction (vehicle height direction) (refer to FIG. 3D).

In addition, when a user does not use the display moving apparatus or when the user attempts to use the display while lying on the seat, the display 1 may be positioned downward by the hinge unit 20 and the folding unit 70 (refer to FIG. 3E).

FIG. 4 and FIG. 5 are schematic diagrams of a display moving apparatus according to a second exemplary form, and FIG. 6 is an operation diagram of a display moving apparatus according to a second exemplary form.

Referring to FIG. 4 and FIG. 5, a display moving apparatus according to a second exemplary form includes: a center rail unit 10, a swing unit 300, an expansion unit 410, a folding unit 70, and a height adjusting unit 80, and may further include a sub-swing unit 50 disposed between the expansion unit 410 and the folding unit 70 and configured to rotate with respect to the vertical axis.

The center rail unit 10 of the a display moving apparatus according to the second exemplary form is the same as the center rail unit 10 of a display moving apparatus according to the first exemplary form as discussed above, and therefore, is not described in further detail.

The swing unit 300 of a display moving apparatus according to the second exemplary form includes: a first fixed bar 311 fixed to the lower rail 13, a third actuator M3 inserted into the first fixed bar 311, and a first rotating bar 313 rotating with respect to the z-axis (vehicle height direction) by the third actuator M3.

The third actuator M3 is mounted to the first fixed bar 311 by being inserted to the first fixed bar 311, and a rotation shaft of the third actuator M3 may be coupled with the first rotating bar 313.

The first rotating bar 313 is disposed with a predetermined gap with the first fixed bar 311 in the vehicle height direction, and may be rotated by the third actuator M3.

The expansion unit 410 of a display moving apparatus according to the second exemplary form includes a screw case 411 mounted to an end of the first rotating bar 313.

The screw case 411 may be formed such that a bottom surface is open.

The screw case 411 is engaged with an end of the first rotating bar 313, such that the screw case 411 may rotate with the first rotating bar 313 when the first rotating bar 313 rotates.

A fourth actuator M4 producing power is installed inside the screw case 411, and a rotation shaft of the fourth actuator M4 is coupled with a second screw 413. The second screw 413 is rotatably disposed within the screw case 411, and elongated along the screw case 411.

The second screw 413 is slidably coupled with a second screw housing 415. The second screw housing 415 is formed with a second screw hole through which the second screw 413 is inserted, and an interior of the second screw hole is threaded with threads corresponding to the second screw 413.

The second screw 413 is gear-engaged with the second screw hole formed in the second screw housing 415. By the rotation of the second screw 413 by the fourth actuator M4, the second screw housing 415 slides along the second screw 413.

According to the second exemplary form, a sub-swing unit 50 is disposed under the expansion unit 410 and may rotate the display 1 with respect to vehicle height direction.

The sub-swing unit 50 includes a second fixed bar 51 mounted to a bottom of the second screw housing 415, a fifth actuator M5 inserted into the second fixed bar 51, and a second rotating bar 53 connected to the fifth actuator M5 and being rotatable with respect to the second fixed bar 51.

That is, the sub-swing unit 50 is formed such that, by the fifth actuator M5 inserted into the second fixed bar 51, the second rotating bar 53 may rotate with respect to the second fixed bar 51, with respect to the z-axis (vehicle height direction).

A fixed bracket 71 of the folding unit 70 is mounted to a bottom of the second rotating bar 53.

The folding unit 70 and the height adjusting unit 80 of a display moving apparatus according to the second exemplary form are the same as the folding unit 70 and height adjusting unit 80 of a display moving apparatus according to the first exemplary form as discussed above, and therefore, are not described in further detail.

Referring to FIGS. 6A to 6E, an operation of a display moving apparatus according to the second exemplary form is described in detail.

Figure 6A:
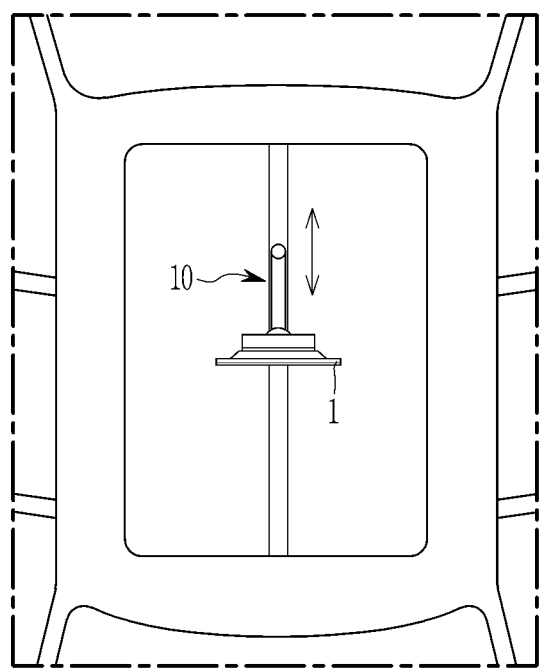
Figure 6B:
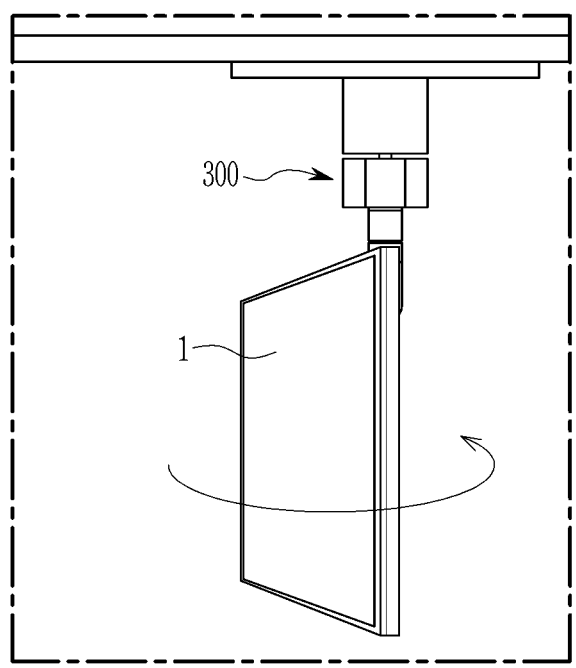
Figure 6C:
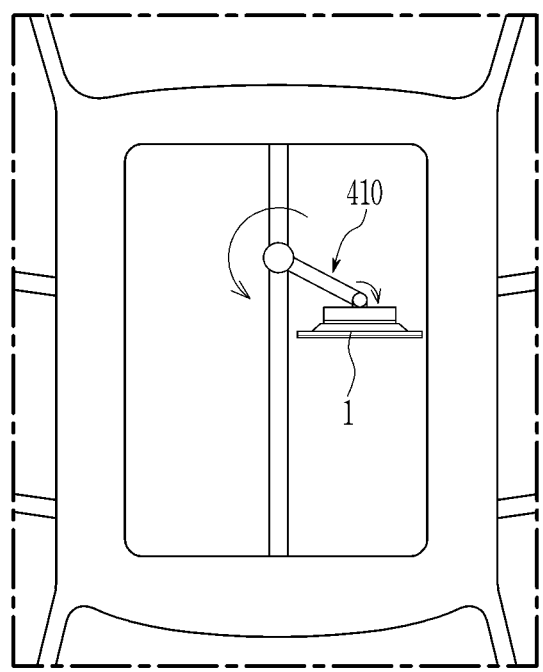
Figure 6D:
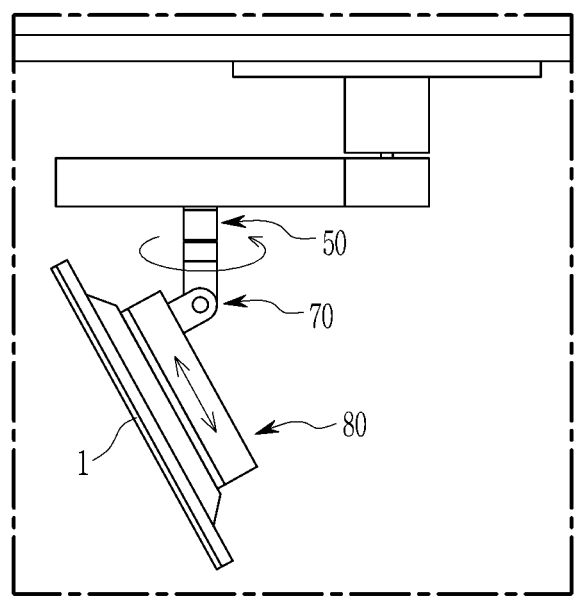

Firstly, when the center rail unit 10 is operated, the display 1 moves in the x-axis direction of the vehicle body (vehicle length direction) (refer to FIG. 6A). When the swing unit 300 is operated, the display 1 may rotate about the z-axis (vehicle height direction) (refer to FIG. 6B). When the expansion unit 410 is operated, the display 1 moves along the screw case 411 (refer to FIG. 6C).

In addition, the display 1 may be tilted by the folding unit 70 with respect to the y-axis by a predetermined angle. When the sub-swing unit 50 is operated, the display 1 may further rotate with respect to the z-axis (vehicle height direction). Then the height adjusting unit 80 is operated, and the display 1 may move in the z-axis direction (vehicle height direction) (refer to FIG. 6D).

In addition, when a user does not use the display moving apparatus or when the user attempts to use the display while lying on the seat, the display 1 may be positioned downward by the folding unit 70 (refer to FIG. 6E).

FIG. 7 and FIG. 8 are schematic diagrams of a display moving apparatus according to a third exemplary form, and FIGS. 9A-9D respectfully illustrate an operation diagram of a display moving apparatus according to the third exemplary form.

Referring to FIG. 7 and FIG. 8, a display moving apparatus according to the third exemplary form includes: a center rail unit 10, a swing unit 300, an expansion unit 410, a folding unit 70, and a height adjusting unit 80, and may further include a link unit 60 disposed between the expansion unit 420 and the folding unit 70 and configured to rotate at an end of the expansion unit 420.

The center rail unit 10 of a display moving apparatus according to the third exemplary form is the same as the center rail unit 10 of a display moving apparatus according to the first exemplary form, and therefore, is not described in further detail.

In addition, the swing unit 300 of a display moving apparatus according to the third exemplary form is the same as the swing unit 300 of a display moving apparatus according to the second exemplary form, and therefore, is not described in further detail.

The expansion unit 420 of a display moving apparatus according to the third exemplary form may include a first arm 421 mounted to the first rotating bar 313 of the swing unit 300, and a link unit 60 rotatably coupled with the first arm 421.

The first arm 421 is mounted to an end of the first rotating bar 313 and extends in the vehicle length direction (refer to FIG. 8), and may rotate together with the first rotating bar 313 that is rotated by the third actuator M3.

According to a display moving apparatus according to the third exemplary form, the link unit 60 is provided at an end of the expansion unit 420.

The link unit 60 may include a sixth actuator M6 inserted in an end of the first arm 421, a second arm 61 configured to be rotated by the sixth actuator M6, and a seventh actuator M7 inserted into an end of the second arm 61.

The second arm 61 is connected to a rotation shaft of the sixth actuator M6 inserted on the first arm 421 such that the second arm 61 may be rotatable by the sixth actuator M6 with respect to the first arm 421.

That is, an end of the second arm 61 is connected to the first arm 421, and another end of the second arm 61 is connected to the fixed bracket 71 of the folding unit 70.

The folding unit 70 of a display moving apparatus according to the third exemplary form is connected to a rotation shaft of the seventh actuator M7 that is inserted into the second arm 61. That is, the fixed bracket 71 of the folding unit 70 is connected to the rotation shaft of the seventh actuator M7.

The folding unit 70 and the height adjusting unit 80 of a display moving apparatus according to the third exemplary form are the same as the folding unit 70 and the height adjusting unit 80 of a display moving apparatus according to the first exemplary form, and therefore, is not described in further detail.

Referring to FIGS. 9A-9D, an operation of a display moving apparatus according to the third exemplary form is described in detail.

Figure 9A:
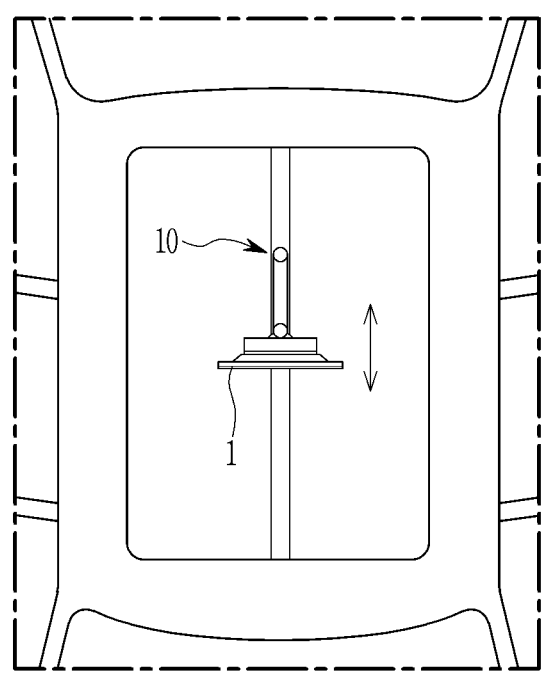

Firstly, when the center rail unit 10 is operated, the display 1 moves along the x-direction (vehicle length direction) (refer to FIG. 9A).

Figure 9B:
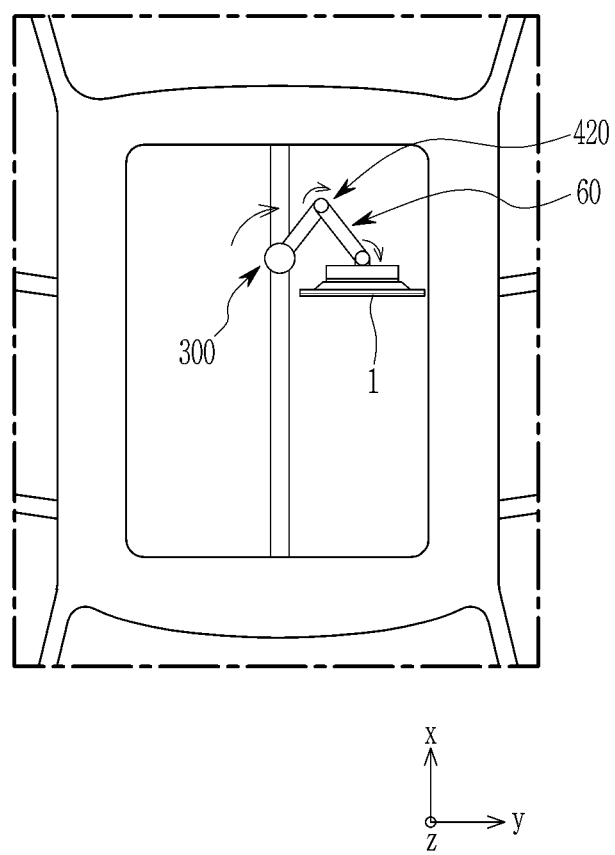

When the swing unit 300 is operated, display 1 rotates with respect to the z-axis (vehicle height direction), and when the link unit 60 of the expansion unit 420 is operated, the display 1 rotates with respect to the vehicle height direction and thereby the position of the display 1 in the vehicle width direction is changed (refer to FIG. 9B).

Figure 9C:
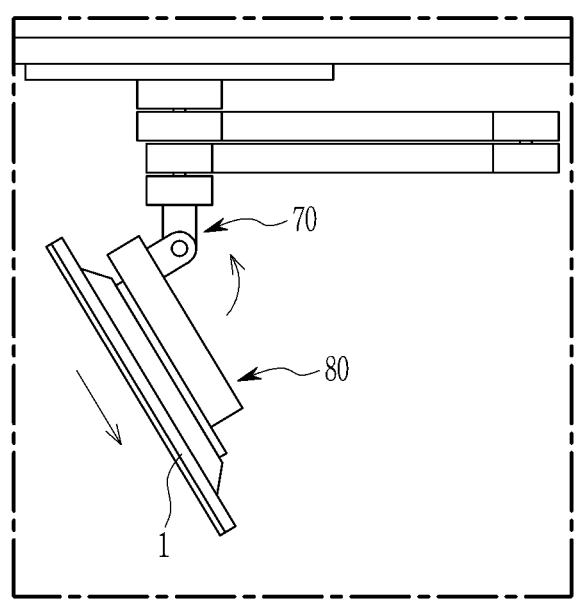

In addition, the display 1 may be tilted by a predetermined angle with respect to the y-axis by the folding unit 70, and when the height adjusting unit 80 is operated, the display 1 moves along the z-axis direction (vehicle height direction) (refer to FIG. 9C).

Figure 9D:
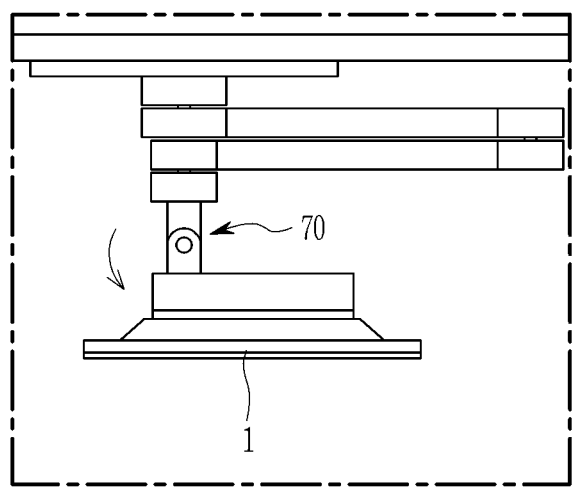

In addition, when a user does not use the display moving apparatus or when the user attempts to use the display while lying on the seat, the display 1 may be positioned downward by the folding unit 70 (refer to FIG. 9D).

A display moving apparatus according to exemplary forms may be operated by the first to eighth actuators M1 to M8.

The first to eighth actuators M1 to M8 may be configured to receive control signals from a separate controller regarding rotating direction, and etc.

According to a display moving apparatus according to exemplary forms, a display is movable regardless of seating positions in a vehicle, and thereby usability of the display may be improved.

In addition, a display moving apparatus according to exemplary forms may provide more degree of freedom in position of the display for displaying visual contents in an autonomous vehicle.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 1: display | 3: center roof frame |
| 5: head lining | 10: center rail unit |
| 11: upper rail | 13: lower rail |
| 15: slider | 17: first screw housing |
| 19: first screw | M1: first actuator |
| G1: first guide bar | 20: hinge unit |
| 21: hinge bracket | 23: hinge pin |
| 25: hinged bar | 30, 300: swing unit |
| 31: swing bar | 33: rib |
| 311: first fixed bar | 313: first rotating bar |
| M3: third actuator | 40, 410, 420: expansion unit |
| 41: worm shaft case | 43: worm shaft |
| 45: worm wheel | 47: motor case |
| M2: second actuator | G2: second guide bar |
| 411: screw case | 413: second screw |
| 415: second screw housing | M4: fourth actuator |
| 421: first arm | 50: sub-swing unit |
| 51: second fixed bar | 53: second rotating bar |
| M5: fifth actuator | 60: link unit |
| 61: second arm | M6: sixth actuator |
| M7: seventh actuator | 70: folding unit |
| 71: fixed bracket | 73: folding bracket |
| 80: height adjusting unit | 81: fixed plate |
| 83: rack gear | 85: connection plate |
| 87: pinion gear | 89: slider member |
| M8: eighth actuator | G3: third guide bar |

What is claimed is:
1. A display moving apparatus, comprising:
a center rail unit configured to slide along a length direction of a vehicle;

a swing unit disposed below the center rail unit, and configured to rotate relative to a height direction of the vehicle;

an expansion unit connected to the swing unit and configured to slide along a width direction of the vehicle;

a folding unit including a fixed bracket mounted to a bottom of the expansion unit, and a folding bracket rotatably connected to the fixed bracket through a hinge pin; and a height adjusting unit connected to the folding unit and configured to slide a display along the height direction.

2. The display moving apparatus of claim 1, wherein the center rail unit comprises:

an upper rail mounted along a center roof frame disposed in the length direction;

a lower rail slidably mounted along the upper rail interposing a slider;

a first screw disposed in the length direction between the upper rail and the lower rail;

a first actuator connected to an end of the first screw and configured to rotate the first screw;

a first screw housing disposed between the upper rail and the lower rail, bolt-engaged with the lower rail in a state fitted with the first screw, and configured to slide along the first screw together with the lower rail by an operation of the first actuator; and a first guide bar disposed in the length direction, having both ends having fixed positions, and configured to guide a movement of the first screw housing.

3. The display moving apparatus of claim 1, further comprising:

a hinge unit disposed between the center rail unit and the swing unit and configured to tilt the display by a predetermined angle.

4. The display moving apparatus of claim 3, wherein the hinge unit comprises:

a hinge bracket mounted to a bottom center portion of a lower rail; and a hinged bar hinged to the hinge bracket through a hinge pin.

5. The display moving apparatus of claim 3, wherein the swing unit comprises:

a swing bar rotatably coupled with the hinge unit; and a rib formed between the expansion unit and the swing bar.

6. The display moving apparatus of claim 3, wherein the expansion unit comprises:

a worm shaft case mounted to the swing unit and extending in the width direction;

a worm shaft disposed along in the width direction and having both ends rotatably installed inside the worm shaft case;

a second guide bar disposed at an adjacent position of the worm shaft, being elongated in the width direction, and having both ends fixed;

a second actuator installed inside a motor case slidably mounted to the worm shaft case; and a worm wheel coupled with a rotation shaft of the second actuator and teeth-engaged with the worm shaft.

7. The display moving apparatus of claim 6, wherein the fixed bracket of the folding unit is mounted to a bottom of the motor case, and configured to slide in the width direction by an operation of the worm shaft and the worm wheel.

8. The display moving apparatus of claim 3, wherein the swing unit comprises:

a first fixed bar fixed to a lower rail;

a third actuator mounted to the first fixed bar; and a first rotating bar disposed below the first fixed bar and connected to the third actuator to be rotated relative to the height direction.

9. The display moving apparatus of claim 8, wherein the expansion unit comprises:

a screw case mounted to the first rotating bar, extending in the length direction, and configured to rotate by a rotation of the first rotating bar;

a fourth actuator mounted inside the screw case;

a second screw disposed within the screw case, configured to rotate by the fourth actuator, and elongated along the screw case; and a second screw housing engaged with the second screw and configured to slide along the second screw by the fourth actuator.

10. The display moving apparatus of claim 9, further comprising:

a sub-swing unit disposed between the expansion unit and the folding unit and configured to rotate relative to the height direction.

11. The display moving apparatus of claim 10, wherein the sub-swing unit comprises:

a second fixed bar mounted to a bottom of the second screw housing;

a fifth actuator mounted to the second fixed bar; and a second rotating bar disposed below the second fixed bar and connected to the fifth actuator to be rotated relative to the height direction.

12. The display moving apparatus of claim 11, wherein the folding bracket of the folding unit is mounted to a bottom of the second rotating bar.

13. The display moving apparatus of claim 8, wherein the expansion unit comprises:

a first arm mounted to the first rotating bar, extending in the length direction, and configured to rotate together with the first rotating bar.

14. The display moving apparatus of claim 13, further comprising:

a link unit rotatably coupled with the first arm.

15. The display moving apparatus of claim 14, wherein the link unit comprises:

a sixth actuator mounted on the first arm;

a second arm configured to rotate by the sixth actuator; and a seventh actuator mounted to the second arm.

16. The display moving apparatus of claim 15, wherein the folding bracket of the folding unit is connected to a rotation shaft of the seventh actuator.

17. The display moving apparatus of claim 1, wherein the height adjusting unit comprises:

a fixed plate mounted to a front end of the folding bracket;

a rack gear disposed at the fixed plate and elongated in the height direction;

a connection plate connected to the fixed plate, configured to mount the display, and installed with an actuator; and a pinion gear coupled with a driveshaft of the actuator and gear-engaged with the rack gear.

18. The display moving apparatus of claim 17, wherein the height adjusting unit comprises:

a third guide bar disposed at both sides of the rack gear in the fixed plate; and a slider member mounted to the connection plate and slidably installed to the third guide bar.

* * * * *